US011425043B2

(12) United States Patent
Slovetskiy

(10) Patent No.: US 11,425,043 B2
(45) Date of Patent: Aug. 23, 2022

(54) DUPLEX LOAD BALANCING FOR MASSIVE IOT APPLICATIONS

(71) Applicant: T-Mobile USA, Inc., Bellevue, WA (US)

(72) Inventor: Sergey Slovetskiy, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 16/902,562

(22) Filed: Jun. 16, 2020

(65) Prior Publication Data
US 2021/0392079 A1    Dec. 16, 2021

(51) Int. Cl.
*H04L 47/125*    (2022.01)
*H04L 45/00*    (2022.01)
(Continued)

(52) U.S. Cl.
CPC ........... *H04L 47/125* (2013.01); *H04L 45/34* (2013.01); *H04L 61/2503* (2013.01); *H04L 61/2521* (2013.01); *H04L 61/2525* (2013.01); *H04L 63/166* (2013.01); *H04L 67/1002* (2013.01); *H04L 67/1027* (2013.01);
(Continued)

(58) Field of Classification Search
CPC ... H04L 45/34; H04L 47/125; H04L 61/2503; H04L 61/2521; H04L 61/2525; H04L 63/166; H04L 67/1002; H04L 67/1027; H04L 67/1036; H04L 69/164; H04L 69/22
See application file for complete search history.

(56) References Cited

U.S. PATENT DOCUMENTS 7,047,315 B1 * 5/2006 Srivastava ............. H04L 45/50
370/236
8,095,668 B2 * 1/2012 Mitchell .................. H04L 67/14
709/228
(Continued)

FOREIGN PATENT DOCUMENTS

EP    1182832 A2    2/2002
EP    1444775 A2    8/2004
(Continued)

OTHER PUBLICATIONS

E. Rescorla. "Request for Comments (RFC) 8446: The Transport Layer Security (TLS) Protocol Version 1.3", Internet Engineering Task Force (IETF), Aug. 2018, 160 pages. (Year: 2018).*
(Continued)

*Primary Examiner* — George C Neurauter, Jr.
(74) *Attorney, Agent, or Firm* — Han Santos, PLLC

(57) ABSTRACT

A middlebox system that maintains a load balancing configuration in a large scale IoT deployment is provided. The system performs reverse address translation for a first packet of a particular application from a first server to a first client according to a binding structure that couples a source address indicating the first client with (i) a destination addresses indicating the first server and (ii) an application client marker of the first client for the particular application. The system performs reverse address translation for a second packet of the particular application from a second server to the first client by using the application client marker in the binding structure to determine the source address indicating the first client.

21 Claims, 9 Drawing Sheets

(51) Int. Cl.
    *H04L 61/2521*     (2022.01)
    *H04L 9/40*     (2022.01)
    *H04L 69/164*     (2022.01)
    *H04L 69/22*     (2022.01)
    *H04L 67/1001*     (2022.01)
    *H04L 67/1036*     (2022.01)
    *H04L 61/2503*     (2022.01)
    *H04L 67/1027*     (2022.01)

(52) U.S. Cl.
    CPC ........ *H04L 67/1036* (2013.01); *H04L 69/164* (2013.01); *H04L 69/22* (2013.01)

(56) References Cited

U.S. PATENT DOCUMENTS

| | | | | |
|---|---|---|---|---|
| 8,204,982 | B2* | 6/2012 | Casado | H04W 4/029 709/224 |
| 8,463,904 | B2* | 6/2013 | Casado | H04L 63/10 709/224 |
| 8,468,259 | B2* | 6/2013 | Mitchell | H04L 67/02 709/228 |
| 8,489,751 | B2* | 7/2013 | Mitchell | H04L 67/02 709/228 |
| 8,913,611 | B2* | 12/2014 | Koponen | H04L 61/2521 370/389 |
| 9,306,909 | B2* | 4/2016 | Koponen | H04L 41/0823 |
| 9,319,459 | B2* | 4/2016 | Ramasamy | H04L 67/1027 |
| 9,602,404 | B2* | 3/2017 | Koponen | H04L 41/12 |
| 9,635,114 | B2* | 4/2017 | Eggert | H04L 61/2521 |
| 9,697,030 | B2* | 7/2017 | Koponen | H04L 41/0806 |
| 10,257,061 | B2* | 4/2019 | Menon | H04L 43/0811 |
| 10,291,723 | B2* | 5/2019 | Eggert | H04L 67/147 |
| 10,321,360 | B2* | 6/2019 | Mahapatra | H04L 67/146 |
| 10,514,941 | B2* | 12/2019 | Zhang | H04L 63/0218 |
| 10,949,248 | B2* | 3/2021 | Zhang | G06F 9/45558 |
| 2008/0209068 | A1* | 8/2008 | Herzog | H04L 61/2553 709/232 |
| 2012/0166656 | A1* | 6/2012 | Asveren | H04L 65/1076 709/228 |
| 2013/0297733 | A1* | 11/2013 | Mitchell | H04L 29/12924 709/217 |
| 2015/0082021 | A1* | 3/2015 | Mandyam | H04L 63/166 713/151 |
| 2015/0117445 | A1* | 4/2015 | Koponen | H04L 29/12358 370/389 |
| 2016/0094643 | A1* | 3/2016 | Jain | H04L 45/44 709/226 |
| 2016/0112372 | A1* | 4/2016 | Katz | H04L 63/029 726/15 |
| 2017/0078359 | A1* | 3/2017 | Herrero | H04L 63/0428 |
| 2018/0262388 | A1* | 9/2018 | Johnson | G06Q 10/103 |
| 2018/0376516 | A1* | 12/2018 | Bandlamudi | H04L 69/164 |
| 2019/0207776 | A1* | 7/2019 | Wang | H04L 61/2557 |
| 2019/0319933 | A1* | 10/2019 | Jiang | G06F 9/5083 |
| 2021/0036985 | A1* | 2/2021 | Jimenez | H04L 61/256 |
| 2021/0359954 | A1* | 11/2021 | Mestery | H04L 67/10 |

FOREIGN PATENT DOCUMENTS

| | | | | |
|---|---|---|---|---|
| EP | 1032178 B1 | | 5/2005 | |
| WO | WO-2021009553 A1 | * | 1/2021 | ........... H04L 69/161 |
| WO | WO-2021009554 A1 | * | 1/2021 | ......... H04L 63/0428 |

OTHER PUBLICATIONS

E. Rescorla et al. "The Datagram Transport Layer Security (DTLS) Protocol Version 1.3", Internet Draft, draft-ietf-tls-dtls13-38, May 29, 2020, 61 pages. (Year: 2020).*
Corbet, Jonathan. Foo over UDP. LWN.net, Oct. 1, 2014 [online], [retrieved on Oct. 11, 2019] Retrieved from the Internet URL: https://lwn.net/Articles/614348.
Herbert, et al. Generic UDP Encapsulation. IETF.org, Mar. 7, 2019 [online], [retrieved on Oct. 11, 2019] Retrieved from the Internet URL: https://tools.ietf.org/html/draft-ietf-intarea-gue-07.
Herbert, Tom. UDP Encapsulation in Linux, netfilter.org, Feb. 14-17, 2015 [online], [retrieved on Oct. 11, 2019] Retrieved from the Internet URL: https://wiki.netfilter.org/pablo/netdev0.1/papers/UDP-Encapsulation-in-Linux.pdf.
Load balancing (computing). Wikipedia.org, Mar. 7, 2019 [online], [retrieved on Oct. 4, 2019] Retrieved from the Internet via Archive.org. URL: https://web.archive.org/web/20191004094710/https://en.wikipedia.org/wiki/Load_balancing_(computing).
Rescorla, et al. Connection Identifiers for DTLS 1.2, draft-ietf-tls-dtls-connection-id-06, IETF.org, Jul. 8, 2019 [online], [retrieved on Oct. 11, 2019] Retrieved from the Internet URL: https://tools.ietf.org/html/draft-ietf-tls-dtls-connection-id-06.
European Patent Application No. 21167265.4, Extended Search Report dated Sep. 15, 2021, 7 pages.

* cited by examiner

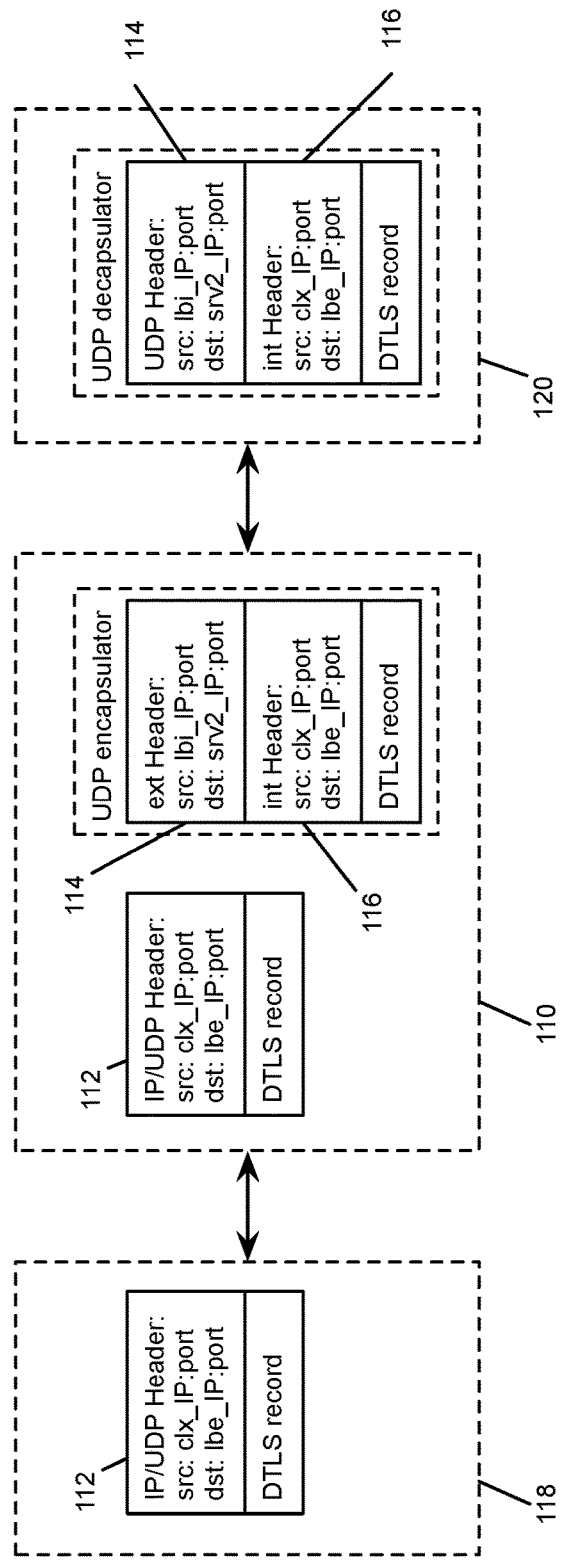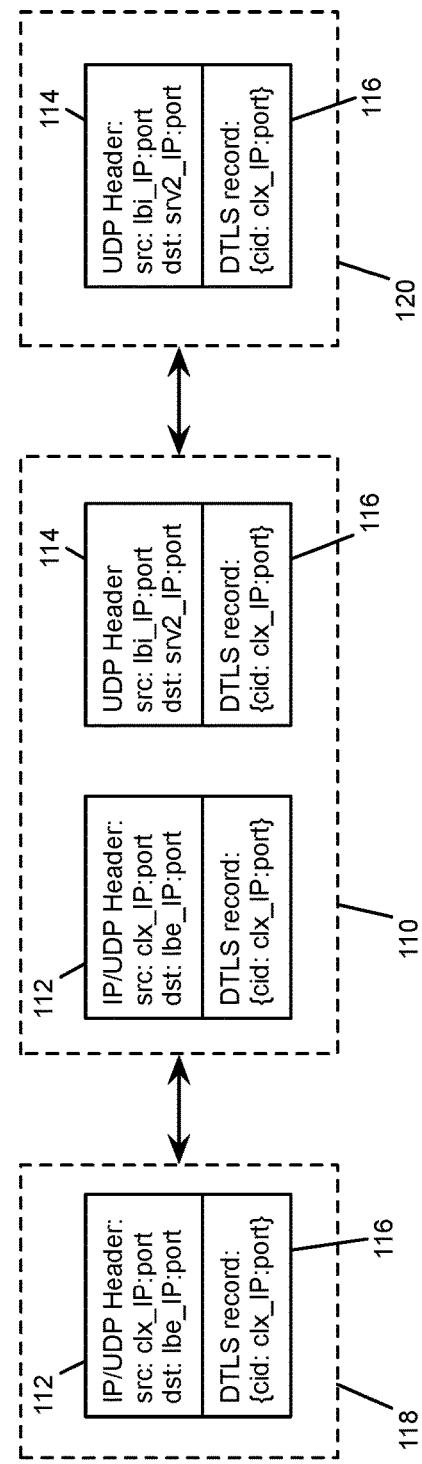

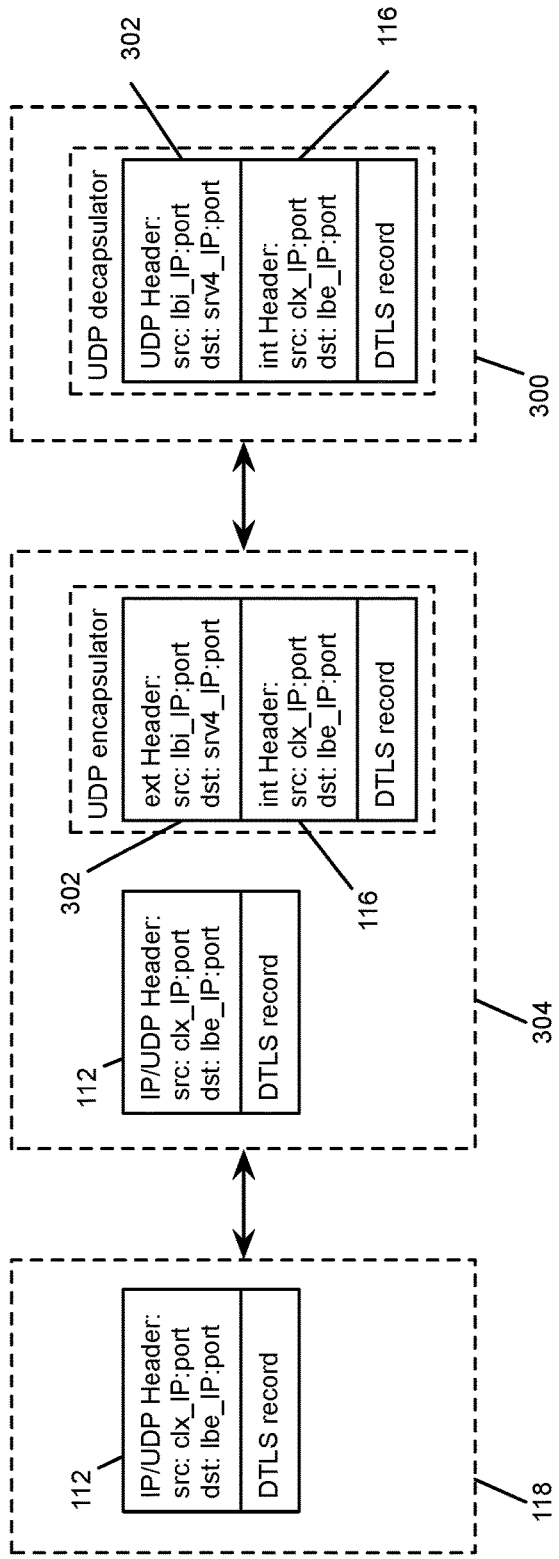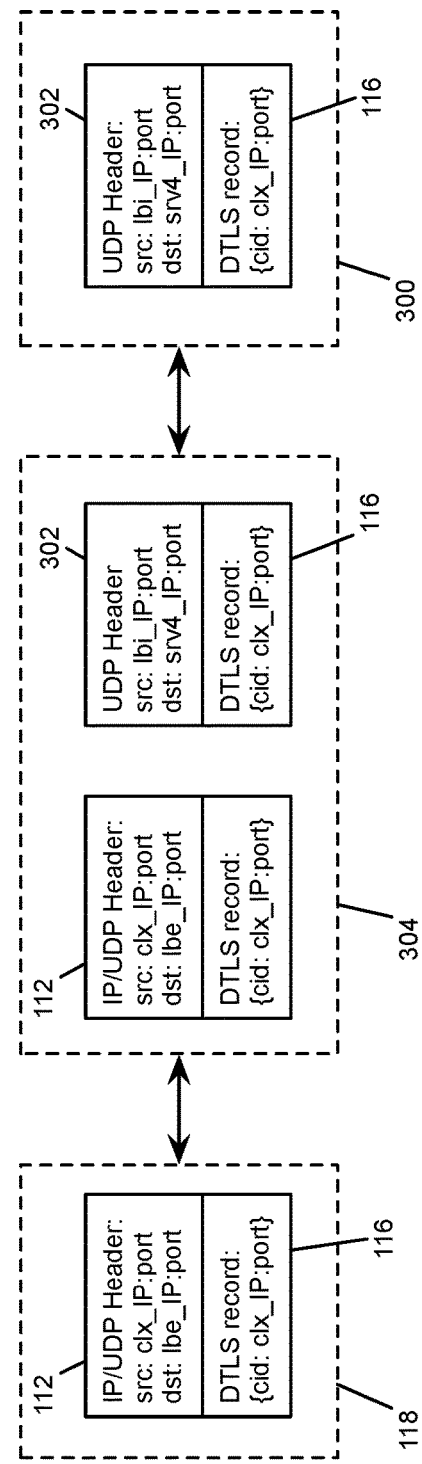

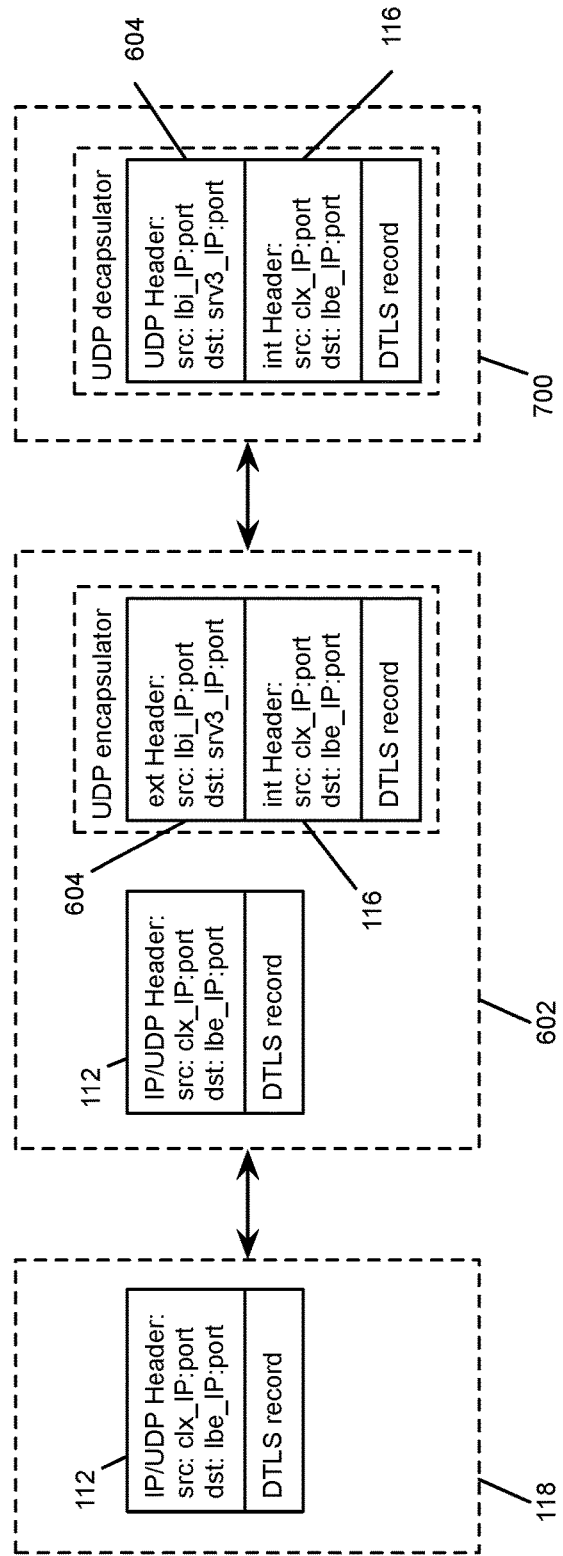
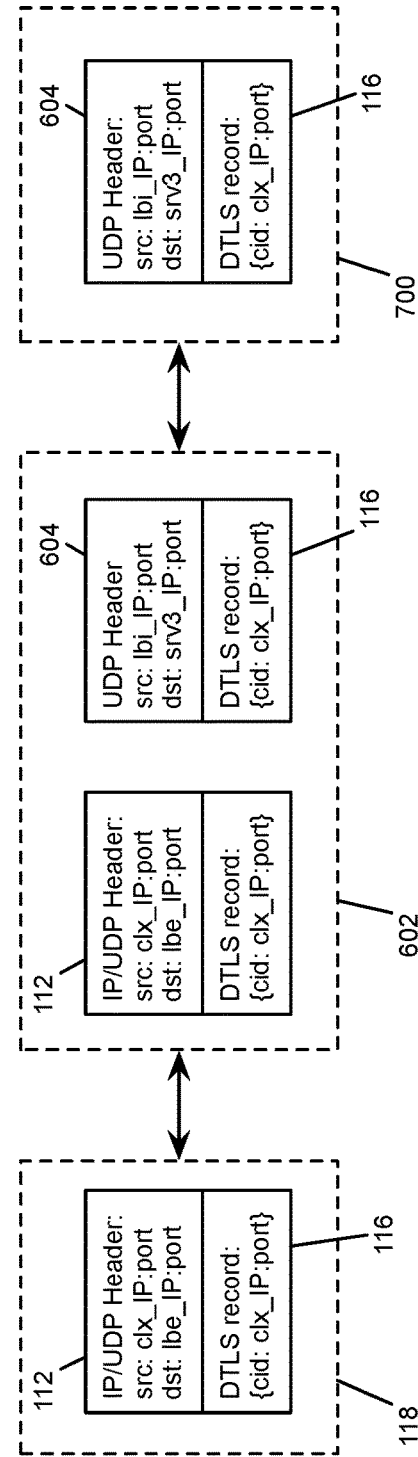
FIG. 7A
FIG. 7B

DUPLEX LOAD BALANCING FOR MASSIVE IOT APPLICATIONS

BACKGROUND

Middleboxes are widely deployed across both private and public networks. Dedicated middlebox hardware is widely deployed in enterprise networks to improve network security and performance. Examples of middlebox functions may include load balancing (LB), network address translation (NAT), proxies, firewall, and deep packet inspection (DPI).

LB provides one point of entry to a service, but forwards traffic flows to one or more hosts that actually provide the service. NAT replaces the source and/or destination IP addresses of packets that traverse the NAT. Typically, NAT is deployed to allow multiple hosts to share a single IP address. For example, hosts "behind" the NAT are each assigned a private IP address and the packets from the hosts destined to the public Internet traverse a NAT, which replaces the packets' internal private IP addresses with a shared public address. Network providers frequently use NAT to manage access to scarce resources.

Load balancing is often defined and used based on the requirements of Web-based applications with the client-server RESTful model (a model that conforms to a representational state transfer (REST) architectural style), where interaction is mostly initiated by clients and follows the Client-Server Request-Response model. In this model, load balancing is usually configured in a Server Load Balancing (SLB) configuration as a reverse proxy with a reverse Network Address Translation (NAT), where each traffic request from an "external" client is routed through a proxy server to an "internal" set of servers hidden behind the proxy. Often this model is complemented with the reverse NAT where the destination IP:port tuple is overwritten for server instance access, in order to save the pool of IP addresses. If only the destination IP NAT is used, then the source IP: port tuple of the requesting client is not changed, and a server can send traffic directly back to clients/devices, bypassing the load balancer. If, however, for security reasons, the source IP NAT is used, when the client source IP: port tuple is overwritten with the load balancer's internal dynamic IP: port combination, then the device behind such NAT will only be accessible during the lifetime of the NAT binding. In this case the load balancer will keep the mapping (state) of the NAT binding between the original device source IP: port and the load balancer's internal IP address and port. Additionally, such binding usually is made 'sticky' so that it points to the same internal server instance, which negates the load balancing aspect of the configuration. Such a configuration can be used for security reasons as it allows the reverse traffic to only be sent to the originating internal load balancer IP address and port, traversing the same route in and out of the system.

BRIEF DESCRIPTION OF THE DRAWINGS

The detailed description is described with reference to the accompanying figures, in which the left-most digit(s) of a reference number identifies the figure in which the reference number first appears. The use of the same reference numbers in different figures indicates similar or identical items.

FIGS. 2A-B illustrate example packets between a client, the middlebox, and a server that use application client markers for NAT operations.

FIGS. 4A-B illustrate a new NAT binding after the application has switched to another server.

FIGS. 7A-B illustrate address translation using a NAT binding that was established by an out-of-band message from the application server.

DETAILED DESCRIPTION

Figure 1:
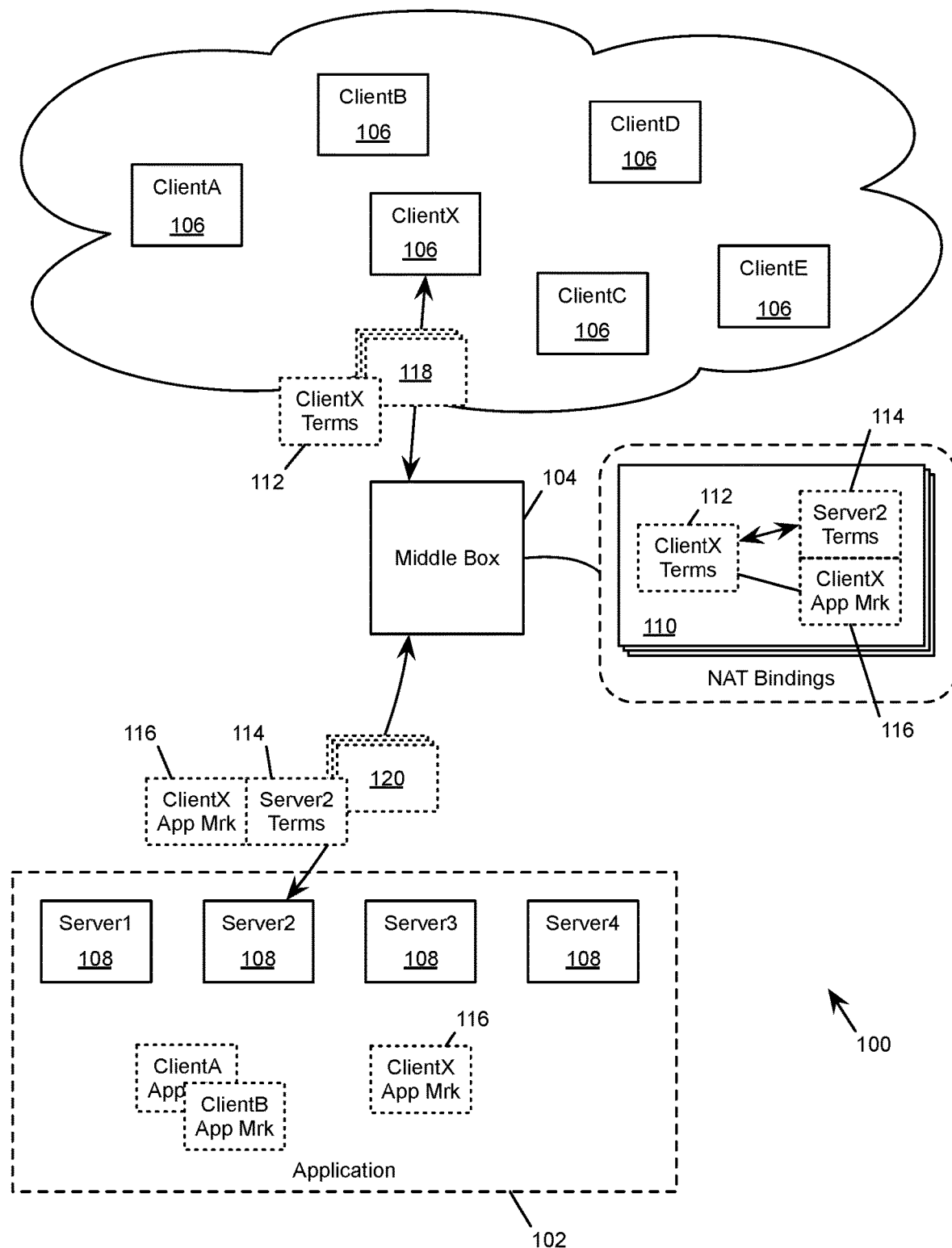
FIG. 1 conceptually illustrates a middlebox system that performs network address translation by using application client markers.

Developing and maintaining a load balancing configuration is problematic for large scale IoT (Internet of Things) deployments, where reverse traffic from server instances to the IoT devices is required. Additionally, in massive IoT deployments, constrained IoT devices are expected to be in a Power Saving Mode (PSM), or "sleeping" most of the time. This presents a problem for middleboxes or load balancers because sleeping IoT devices correspond to long term network address translation (NAT) bindings active on the middlebox devices, consuming resources at the middlebox, such as memory and processor cycles. Typically, NAT bindings are preserved for tens of minutes or at most a couple of hours, while NAT bindings for IoT devices may have to be preserved for several hours or even days. Furthermore, for server-originated (or Mobile Terminated—MT) traffic—the server does not know the original client source IP:port tuple, and has no way to address the client device if a related NAT binding has expired. For client-originated (or mobile originated—MO) traffic, if the client re-binds NAT after waking up from 'sleep' or Power Saving Mode (PSM), the middlebox may route the connection to a new Server instance, which generally does not have a connection or application context for the incoming packets, and does not know how to process the packets. Even if the server knows the client's source IP: port tuple, it does not know how to route MT traffic back to the client via the middlebox or load balancer since there is no corresponding NAT binding at the middlebox.

This disclosure is directed to systems and techniques that maintain a load balancing configuration in a large scale IoT deployment. In some embodiments, additional information is added to a binding to enable reconstruction or updating of the binding. In particular, for an application running on multiple servers (e.g., software that exchanges data with IoT devices and can optionally send instructions to IoT devices), a middlebox system (or LB proxy) performs network address translation by using a binding structure that couples a source address indicating the client with (i) a destination addresses indicating a server and (ii) an application client marker of the client for the particular application. The application client marker is a signal or data field embedded into a packet by an application server to identify the client of the application. If the binding is expired or lost, or if the particular application switches to another (new) server to send data to the client (e.g., in accordance with load balancing operations), the middlebox may use the application client marker to rebind NAT between the new server and the client. In some embodiments, the middlebox couples a specific User Datagram Protocol (UDP) tunneling configuration to a typical LB configuration combining reverse proxy and source NAT, and the application client marker is a client source IP:port tuple that is encapsulated in a UDP payload. Another example of the application client marker is a Datagram Transport Layer Security (DTLS) connection ID that encodes the DTLS client source IP address and port.

The middlebox system ensures load balancing and device addressability and maintains source IP: port tuples. The middlebox system also maintains NAT bindings in both directions (from clients to the servers and from servers to clients), thereby preserving connection consistency for IoT devices and applications, and/or enabling re-establishment of connections with IoT devices that have gone to sleep. In some embodiments, A UDP tunneling protocol is defined for reverse proxy, reverse NAT, and load balancing functions for the IoT device traffic.

In some embodiments, client devices send IoT MO traffic with source IP: port combination (or tuple). The middlebox encapsulates the packets from the IP level and up as the UDP payload, then writes the external packet source IP: port according to the source NAT rules, and forwards packets to the backend server instances. The middlebox maintains the NAT state, mapping source IP: port to the internal source IP: port, and virtual IP (server instance) address:port combination. Backend application server instances implement UDP tunneling, unpack internal packets and pass them to the Applications layer, where the real device/client source IP: port combination are saved and used. Reverse server-initiated (MT) traffic is encapsulated by the application server instance in the UDP tunnel and forwarded to the middlebox.

FIG. 1 conceptually illustrates a middlebox system that performs network address translation by using application client markers. This figure illustrates a network 100 that connects clients with multiple servers of an application 102. The network implements a middlebox 104 that interconnects multiple clients 106 with multiple servers (or backend application server instances) 108.

The network 100 is a cellular network. The network infrastructure of the cellular network 100 may include the core network of the telecommunications service provider. The network infrastructure may include routers, switches, or other types of data forwarding elements for conducting data traffic (e.g., packet traffic) between various network endpoints such as user devices, base stations, hotspots, and other types of computing resources. The core network also provides access to external networks such as the Internet. The core network may include components that provide services to the subscribers of the cellular network and track positions of the user devices. The core network may include a packet network, e.g., an Evolved Packet Core (EPC) that interconnects different components belonging to an Evolved Packet System (EPS). EPC is a framework for providing converged voice and data on a 4G Long-Term Evolution (LTE) network. EPC unifies voice and data on an Internet Protocol (IP) service architecture. The EPC allows the operator of the cellular network 100 to deploy and operate one packet network for 2G, 3G, 4G, 5G, wireless local area network (WLAN), and fixed access such as Ethernet, DSL, cable, and fiber.

The multiple clients 106 include devices that are labeled as "ClientA", "ClientB", . . . "ClientX". The clients 106 may include one or more user devices. Each of the devices may be a desktop computer, a laptop computer, tablet computer, a smartphone, a smartwatch, a personal digital assistant (PDA), or any other computing device or mobile device that is capable of communicating with other devices via a network. The clients 106 may also include one or more IoT devices.

The multiple servers 108 include devices that are labeled as "Server1", "Server2", "Server3", and "Server4". At least some of the servers 108 are backend application server instances for the application 102. Each server may be a general-purpose computer, such as a desktop computer, tablet computer, laptop computer, server, or an electronic device that is capable of receiving inputs, processing the inputs, and generating output data. Each server may also be a virtual computing device such as a virtual machine or a software container that is hosted in a cloud. Each server may also be implemented by multiple computing devices, virtual machines, software containers, and/or so forth.

The middlebox 104 is a computing device that performs NAT, LB, and/or proxy operations between the clients 106 and the servers 108. The middlebox 104 may be a general-purpose computer, such as a desktop computer, tablet computer, laptop computer, server, or an electronic device that is capable of receiving inputs, processing the inputs, and generating output data. The middlebox may also be a virtual computing device such as a virtual machine or a software container that is hosted in a cloud. The middlebox may also be implemented by multiple computing devices, virtual machines, software containers, and/or so forth.

The middlebox 104 performs LB, NAT, and/or proxy operations for packets from the clients to the servers and reverse NAT for packets from the servers to the clients. For some embodiments, the IP addresses used by packet traffic between the client and the middlebox are referred to as "client-side" (or public or exterior) addresses, while the IP addresses used by packet traffic between the middlebox and the servers are referred to as "server-side" (or private or interior) addresses.

For packet traffic from the client to the servers, the clients use a "client-side" address of the middlebox to send packets to the middlebox 104 (and thereby to the servers), and the middlebox in turn performs NAT to replace the client-side address of the middlebox with the "server-side" address of a server. The "client-side" address of the middlebox in this case may serve as a public or virtual address for the servers For packet traffic from the servers to the client, a server uses a "server-side" address of the middlebox to send packets to the middlebox 104 (and thereby to the client), and the middlebox in turn performs reverse NAT to replace the server-side address of the middlebox with the client-side address of the client.

The middlebox 104 performs NAT by using bindings that associate destination addresses used by clients (client-side or external addresses) with receiving addresses used by servers (server-side or internal addresses). Packets sourced by different clients or destined for different servers may use different NAT bindings to translate source and destination IP addresses between the clients and the middlebox (i.e., client-side addresses) into source and destination IP addresses between the middlebox and the server(s) (i.e., server-side address) and vice versa for packets sourced by different servers or destined for different clients. For a network connection between a client and a server for a particular application, a NAT binding may associate client-side source IP addresses with (i) server-side destination IP addresses and (ii) an application client marker of the client for the particular application. If the NAT binding is expired or lost, or if the particular application switches to another server to send data to the client, the middlebox may use the application client marker to rebind NAT between the server and the client at the middlebox, as will be described in greater detail further below, for example with respect to FIGS. 3, 5, and 6.

In the example of FIG. 1, the middlebox 104 performs NAT for packets between the client-side address of client "ClientX" and server side address of the server "Server2" for the application 102 by using a NAT binding 110. The NAT binding 110 couples the ClientX traffic terminals 112 (which includes client-side source and destination addresses specified by ClientX) with (i) the Server2 traffic terminals 114 (which includes server-side source and destination addresses) and (ii) application client marker 116 of ClientX for the application 102. For packets from ClientX to Server2, NAT binding 110 is used by the middlebox 104 to translate client-side addresses into server-side addresses. For packets from Server2 to ClientX, NAT binding 110 is used by the middlebox 104 to translate server-side addresses specified by Server2 into client-side addresses.

The middlebox 104 also inserts application client markers into packets destined for servers. Servers likewise insert application client markers into packets destined for the middlebox 104. The middlebox 104 uses the application client markers to perform NAT binding in certain cases (e.g., when a NAT binding is purged or when the application 102 switches server.) In the example of FIG. 1, packets 118 are packets being exchanged between ClientX and the middlebox 104 for the application 102, and packets 120 are packets being exchanged between Server2 and the middlebox 104 for the application 102. The packets 118 have the ClientX traffic terminals 112. The packets 120 have the Server2 traffic terminals 114 and the application client markers 116.

FIGS. 2A-B illustrate example packets between a client, the middlebox, and a server that use application client markers for NAT operations. The figure illustrates the binding 110 being used to perform NAT between addresses of packets 118 (between ClientX and the middlebox 104) and addresses of packets 120 (between Server2 and the middlebox 104). The binding 110 binds the ClientX traffic terminals 112 with both the Server2 traffic terminals 114 and the application client marker 116.

As illustrated, the binding 110 allows traffic flow between a source tuple clx_IP:port (client-side IP of ClientX) with a destination tuple srv2_IP:port (server-side IP of Server2). For some embodiments, the binding 110 is the basis for a forward binding table that enables forward traffic from ClientX to Server2 (clx_IP:port→srv2_IP:port) as well as a reverse binding table that enables reverse traffic from Server2 to ClientX (srv2_IP:port→clx_IP:port).

FIG. 2A illustrates client-side addresses being used as an application client marker, e.g., the application client marker 116. In some embodiments, a source IP:port tuple indicating the client is encapsulated in a UDP payload as the application client marker. As illustrated, the packets 118 and 120 are IP/UDP packets. The headers of packets 118 specify ClientX traffic terminals 112, which includes the client-side address of ClientX as the source IP:port tuple (clx_IP:port) and the client-side address of the middlebox as the destination IP:port tuple (lbe_IP:port). The headers of packets 120 specify Server2 traffic terminals 114, which includes the server-side address of the middlebox as the source IP tuple (lbi_IP:port) and the server-side address of Server2 as the destination IP:port tuple (srv2_IP:port).

Each packet 120 also includes the application client marker 116 (as an interior header of UDP encapsulation), which specifies the client-side addresses of ClientX as the source IP tuple (clx_IP) and the client-side address of the middlebox as destination IP tuple (lbe_IP), in other words, identical information as ClientX traffic terminals 112.

FIG. 2B illustrates a DTLS connection identifier being used as the application client marker 116. The DTLS connection ID encodes the DTLS client source IP address and port. As illustrated, the headers of the packets 118 specify ClientX traffic terminals 112, which include the client-side addresses of ClientX as the source IP tuple (clx_IP:port) and the client-side address of the middlebox as destination IP tuple (lbe_IP:port). Each packet 118 also includes a DTLS record that includes the connection ID that encodes DTLS client source IP tuple indicating ClientX (cid: clx_IP:port). The headers of the packets 120 specify Server2 traffic terminals 114, which include the server-side address of the middlebox as the source IP tuple (lbi_IP:port) and server-side address of Server2 as the destination IP tuple (srv2_IP:port). Each packet 120 also includes a DTLS record that includes the connection ID that encodes DTLS client source IP tuple indicating ClientX (cid: clx_IP:port). The DTLS connection identifier serve as the application client marker 116.

In some embodiments, DTLS connection identifier (CID) is used to encode the source IP: port of the client (DTLS Client endpoint). IPv4 address length is 4 bytes, and an application port length is 2 bytes, therefore at a minimum 6 bytes of the CID is used for each packet to pass the source IPv4 address:port tuple. In case of IPv6, the length of the CID may be higher. In some embodiments, this DTLS extension is applied end to end between a client and a server as it is negotiated during DTLS handshake end-to-end between DTLS client and DTLS server. However, since the CID is appended to the encrypted DTLS record and is itself unencrypted, the middlebox (LB) may in some embodiments parse the CID, extract the IP:port tuple, and use it to create a new NAT binding. In some embodiments, additional metadata including at least the client source IP address and port information is added to specify the type of information being transferred in the CID. In some embodiments, a serialization format may be used to specify the format (e.g., CBOR, JSON) of the information being transferred and encoded in the CID.

Figure 3:
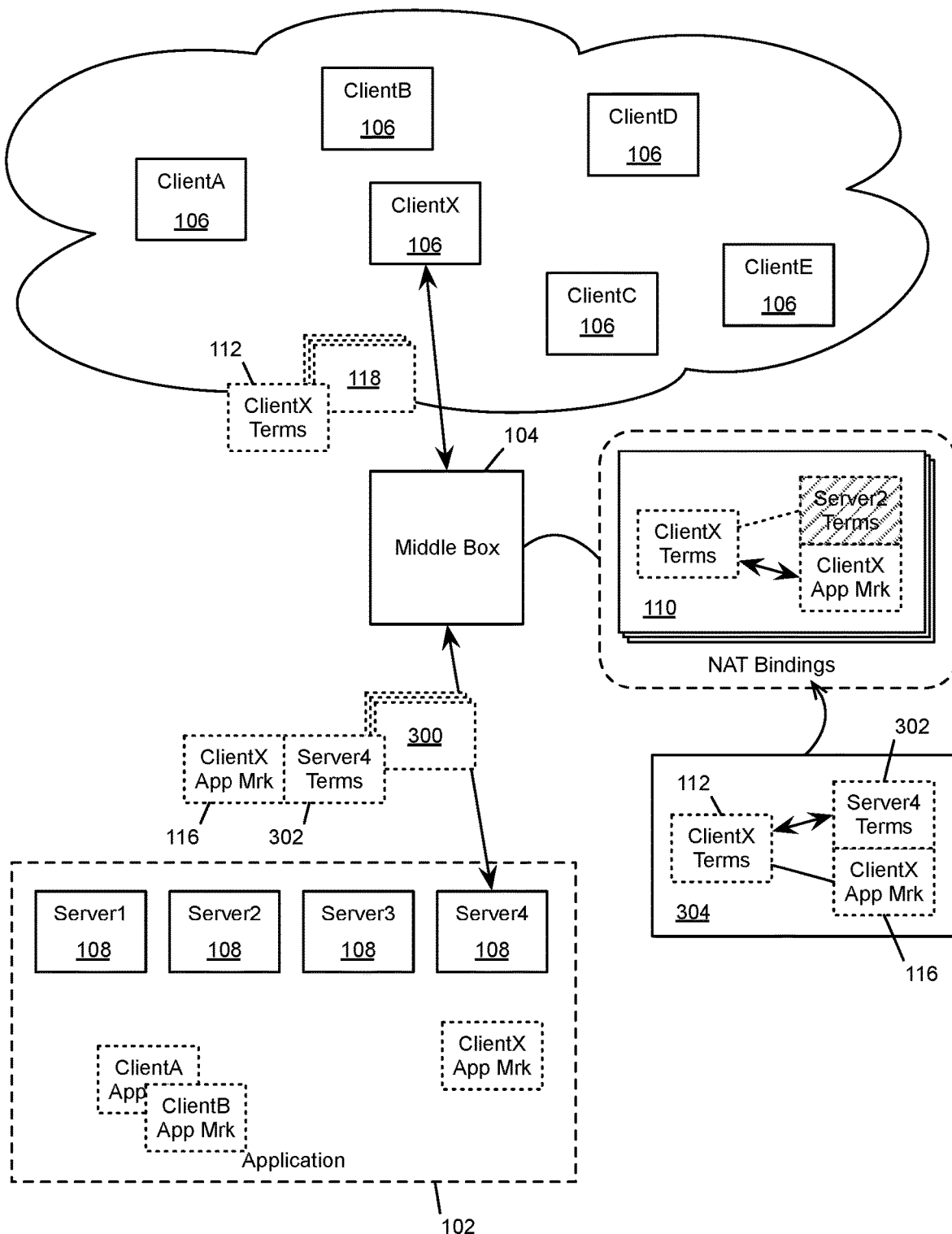
FIG. 3 illustrates rebinding an application server instance and the client when the application switches from one server instance to another server instance.

As mentioned, using an application client marker allows the middlebox to successfully perform NAT, even if the application switches to another server to send data to the client. The application client marker may be used to rebind an application server instance and the client at the middlebox for subsequent NAT operations. FIG. 3 illustrates rebinding an application server instance and the client when the application switches from one server instance to another server instance.

As illustrated in FIG. 3, the application 102 has switched to a server "Server4" for generating data to the client "ClientX". Packets 300 are packets being exchanged between Server4 and the middlebox 104 for the application 102. Server4 has a different IP address than Server2, so the middlebox 104 cannot rely on the existing NAT binding 110 (based on the Server2 Address) to perform address translation. However, the application 102 ensures that the packets 300 include the application client marker 116, which includes information that allows the middlebox 104 to deliver the packet to ClientX (e.g., IP address and port information of ClientX or DTLS connection ID that encodes DTLS client source IP address and port).

The middlebox 104 may generate a new binding 304 that couples the ClientX traffic terminals 112 with (i) Server4 traffic terminals 302 and (ii) application client marker 116 of ClientX for the application 102. The middlebox 104 may subsequently use the newly created binding 304 to perform address translation for packet traffic between ClientX and Server4 for the application 102.

FIGS. 4A-B illustrate the new NAT binding after the application has switched to another server. As illustrated, the new binding 304 allows traffic flow between a source tuple clx_IP:port (client-side IP of ClientX) with a destination tuple srv4 IP:port (server-side IP of Server4). For some embodiments, the binding 304 is the basis for a forward binding table that enables forward traffic from ClientX to Server4 (clx_IP:port→srv4_IP:port) as well as a reverse binding table that enables reverse traffic from Server4 to ClientX (srv4 IP:port→clx_IP:port).

FIG. 4A illustrates the new NAT binding 304 when the client-side address of the ClientX is used as application client marker after the application 102 has switched to Server4. FIG. 4B illustrates the NAT binding 304 when a DTLS connection identifier is used as the application client marker 116 after application 102 has switched to Server4. In the example, the headers of the packets 300 specify the Server4 traffic terminals 302, which includes the server-side address of Server4 as destination IP tuple (srv4 IP:port) and the server-side address of the middlebox 104 as the source IP tuple (lbi_IP:port).

There are different mechanisms for creating new bindings. For MT traffic, the application server performs an internal load balancing, sending traffic to a pool of IP: port combinations or to a dedicated default Gateway IP: port, or to the same internal source tuple that it has received the traffic from. The traffic is encapsulated in the UDP packet, where internal packets have the Client IP:port destination as the application client marker, and the outer packets have the appropriate LB IP:port destination. For MT traffic, the middlebox implements a NAT-type functionality, creating a NAT binding, mapping the received internal IP: port combination to a client device's IP:port tuple. When such a binding is initiated and traversed in both directions, the middlebox implements a UDP tunneling in both directions on the internal interface. Alternatively, an application server may use an API call to create such a binding out of band of the traffic using the client source IP:port mapping and internal LB IP:port combination.

In some embodiments, direct client to server binding can be used as is, provided that the external traffic with the client is encapsulated in the UDP tunnel, specifically client source IP:port→interior LB IP:port of the outer packet of the UDP tunnel. Reverse server to client binding can be based on interior LB IP:port→client source IP:port. In some embodiments, the middlebox may create a forward binding table and a reverse binding table that is separate from the forward binding table. On initial binding, both reverse and forward directions are populated in some embodiments. If the same LB IP:port is being reused by different interior IP:port combinations, then another entry is added to both tables. In some embodiments, the middlebox can be deployed as the Stateless LB/NAT/Proxy, where the binding is created upon reception of each packet.

As mentioned, an IoT device may go to sleep. It may be infeasible for a middlebox to maintain a large number of NAT bindings over an extended period of time for a large number of IoT devices that may have gone to sleep. In some embodiments, the middlebox may let a NAT binding expire or be purged when the binding is not used for address translation for over a threshold period of time. When the IoT device has awakened and the application is to re-establish the connection with the client, the middlebox may use the application client marker to generate a new NAT binding between a server of the application and the client.

Figure 5:
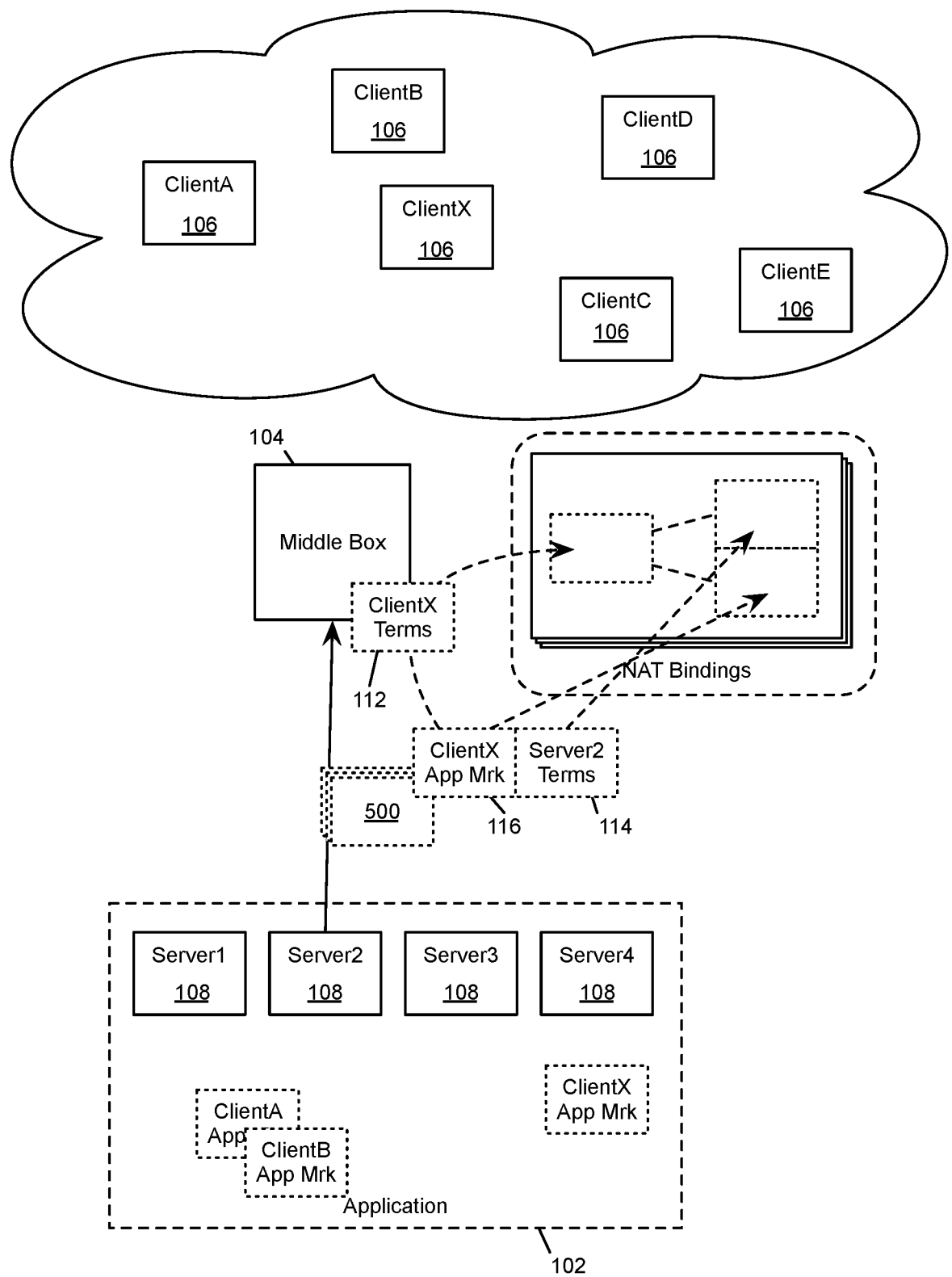
FIG. 5 illustrates generating a new NAT binding for an application after an existing binding for the application has expired.

FIG. 5 illustrates generating a new NAT binding for an application after an existing binding for the application has expired. Though not illustrated, the binding 110 between ClientX and Server2 has expired due to prolong period of inactivity. When the application 102 has awakened to communicate with ClientX, it embeds the application client marker 116 in a packet 500 to the middlebox 104. Based on the information coded in the application client marker 116, the middlebox 104 is able to generate a new NAT binding 502. Specifically, the middlebox 102 uses the application client marker 116 to determine the ClientX traffic terminals 112 (the application client marker 116 may include the ClientX address in an UDP encapsulated interior header or encode the ClientX address as a DTLS connection identifier) . The new NAT binding 502 couples the ClientX traffic terminals 112 with (i) the Server2 traffic terminals 114 in the header of the packet 500 and (ii) the application client marker 116.

In some embodiments, DTLS connection identifier (CID) is specified for the receiving server to identify encrypted DTLS packets belonging to the same client session, even if the middlebox NAT has performed the re-binding, and the server sees completely new source IP:port tuple in the incoming packets. This mechanism allows server instances in distributed deployments to map new NAT binding identified by the LB internal new source IP:port combination as to belong to a known connection, and map that connection to a specific client. However, in some embodiments, the CID is only used to re-bind NATs for the traffic originated by the client, not for a server to initiate new connections to the client if the original NAT binding expired or using stateless NATs.

In some embodiments, the middlebox re-binds NATs according to the following process: If the original binding has not expired, then it is used as-is. If the original binding has expired, and new rebinding is required (i.e. a binding record does not exist in the middlebox), then the DTLS CID field is parsed to extract the client external IP: port. The extracted IP:port is used to create a new NAT binding. In these instances, there is no DTLS packet rewriting, and UDP forwarding (NAT) works as expected since only IP/UDP IP and port headers are used. Security policies may be applied to NOT allow the creation of a new NAT Server to Client binding in case the CID is not present in the DTLS record layer packet or an IP: port tuple cannot be extracted. In stateless LB/NATs such re-binding may be implemented to occur for every packet traversing the LB/NAT middlebox.

Figure 6:
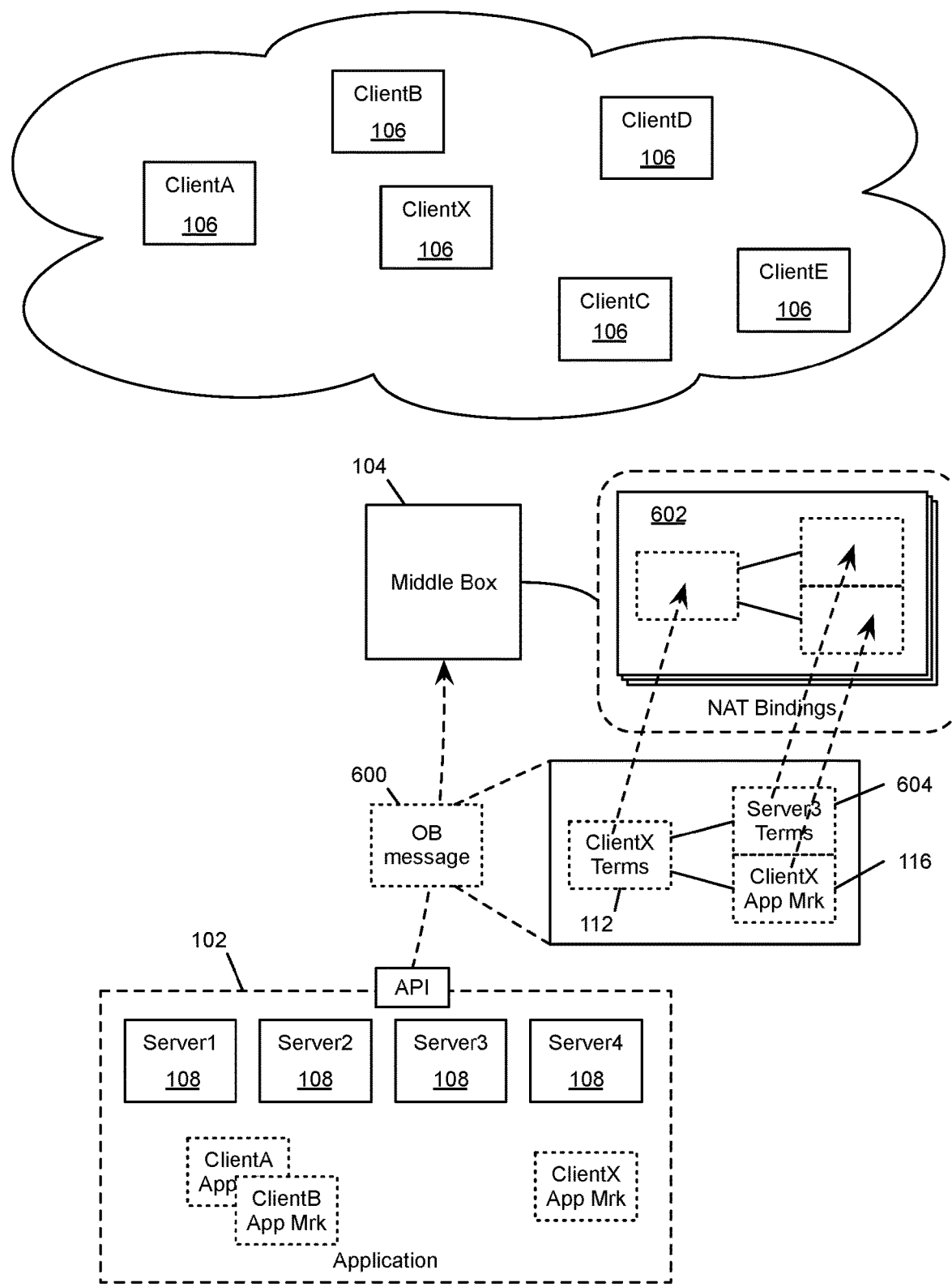
FIG. 6 illustrates using API to send an out-of-band message to the middlebox to generate a new NAT binding.

In some embodiments, an application server for the application 102 may use application program interface (API) to send an out-of-band message to the middlebox 104 in order to generate a new NAT binding. The message may include the application client marker, server-side source address and port, and/or other information that can be used to generate NAT binding between a server and a client for the application. FIG. 6 illustrates using an API to send an out-of-band message to the middlebox to generate a new NAT binding.

As illustrated, in order for the application 102 to send packets from Server3 to ClientX (instead of from Server2), the application server of the application 102 uses an API to send an out-of-band message 600 to the middlebox 102. The message 600 has information for the middlebox 102 to generate a new binding 602 that couples the ClientX traffic terminals 112 with (i) the Server3 traffic terminals 604 and (ii) the application client marker 116. The Server3 traffic terminals 604 includes the server-side IP address and port information of the server "Server3".

FIGS. 7A-B illustrate address translation using a NAT binding that was established by an out-of-band message from the application server. The figure shows the NAT binding 602 being used by the middlebox 104 to perform address translation for packets 118 from ClientX and for packets 700 from Server3. As illustrated, the binding 602 allows traffic flow between a source tuple clx_IP:port (client-side IP of ClientX) with a destination tuple srv3 IP:port (server-side IP of Server3). For some embodiments, the binding 602 is the basis for a forward binding table that enables forward traffic from ClientX to Server3 (clx_IP:port→srv3_IP:port) as well as a reverse binding table that enables reverse traffic from Server3 to ClientX (srv3 IP:port-→clx_IP:port).

FIG. 7A illustrates the new NAT binding 602 when client-side address of ClientX is used as the application client marker 116 in an UDP encapsulated interior header. FIG. 7B illustrates the NAT binding 602 when DTLS connection identifier is used as the application client marker 116. In the example, the headers of the packets 700 specify Server3 traffic terminals 604, which includes the server-side address of the middlebox as the source IP tuple (lbi_IP:port) and server-side address of Server3 as destination IP tuple (srv3_IP:port).

Conventionally, security considerations of the server load balancing deployment require a restricted NAT, i.e. that the outgoing connections from server pool are only allowed to traverse the LB/NAT if the NAT binding exists, i.e. if the same IP:port binding is used for the original incoming connection. However, this cannot be done if NAT bindings are expected to expire and NAT re-binding is performed.

In some embodiments, the middlebox 104 implements security policies, where traffic is only accepted from a pre-configured pool of originating or source IP addresses, and outgoing packets are received on the pre-configured NAT IP address destination pool. In some embodiments, the middlebox implements a security policy that drops any packet that does not have the correct encapsulated payload (such encapsulated payload may include the application client marker in an interior header). In some embodiments, the middlebox 104 decapsulates packets and forwards the decapsulated interior packets to clients/devices on an external (client-side) interface. If a malicious entity tries to spoof the application servers' IP:port combination, upon decapsulation, there will be no internal (server-side) IP:UDP packets to forward, and such packets are discarded.

Example Computing Device

Figure 8:
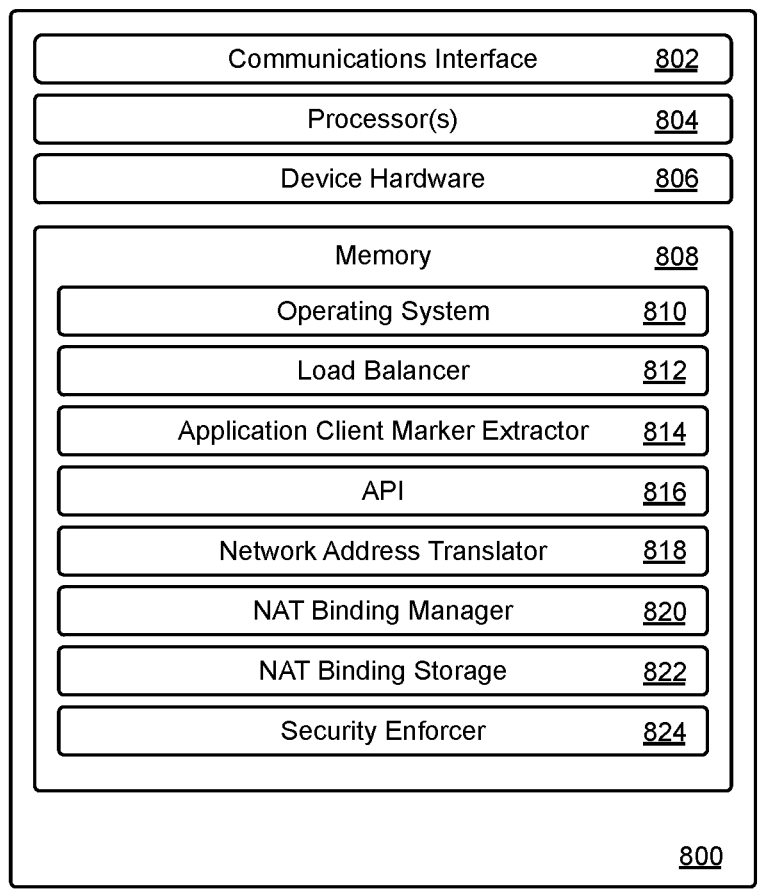
FIG. 8 is a block diagram showing various components of an example middlebox system.

FIG. 8 is a block diagram showing various components of an example middlebox system, consistent with an embodiment of the disclosure. The middlebox system performs load balancing and network address translation. The middlebox is also capable of re-binding by using application client markers in packets between the middlebox and the servers.

The figure illustrates a computing device 800 implementing the middlebox system (e.g., the middlebox 104). The middlebox computing device 800 may be a general-purpose computer, such as a desktop computer, tablet computer, laptop computer, server, or an electronic device that is capable of receiving inputs, processing the inputs, and generating output data. The computing device 800 may also be a virtual computing device such as a virtual machine or a software container that is hosted in a cloud. Alternatively, the computing device 800 may be substituted with multiple computing devices, virtual machines, software containers, and/or so forth.

The computing device 800 may be equipped with one or more of the following: a communications interface 802, one or more processors 804, device hardware 806, and memory 808. The communications interface 802 may include wireless and/or wired communication components that enable the computing devices to transmit data to and receive data from other devices. The data may be relayed through a dedicated wired connection or via a communications network. The device hardware 806 may include additional hardware that performs user interface, data display, data communication, data storage, and/or other server functions.

The memory 808 may be implemented using computer-readable medium, such as computer storage medium. Computer-readable medium includes, at least, two types of computer-readable media, namely computer readable storage media and communications media. Computer readable storage media may include volatile and non-volatile, removable and non-removable media implemented in any method or technology for storage of information such as computer-readable instructions, data structures, program modules, or other data. Computer readable storage media may include, but are not limited to, random-access memory (RAM), dynamic random-access memory (DRAM), read-only memory (ROM), electrically erasable programmable ROM (EEPROM), flash memory or other memory technology, compact-disc-ROM (CD-ROM), digital versatile disks (DVD) or other optical storage, magnetic cassettes, magnetic tape, magnetic disk storage or other magnetic storage devices, or any other non-transitory medium that can be used to store information for access by a computing device. As defined herein, computer-readable storage media do not consist of, and are not formed exclusively by, modulated data signals, such as a carrier wave. In contrast, communication media may embody computer-readable instructions, data structures, program modules, or other data in a modulated data signal, such as a carrier wave, or other transmission mechanisms.

The processors 804 and the memory 808 of the computing device 800 may implement an operating system 810, a load balancer 812, an application client marker extractor 814, an API interface 816, a network address translator 818, NAT binding management 820, and NAT binding storage 822. The various software may include routines, program instructions, objects, and/or data structures that are executed by the processors 804 to perform particular tasks or implement particular abstract data types.

The operating system 810 may include components that enable the computing devices 800 to receive and transmit data via various interfaces (e.g., user controls, communications interface, and/or memory input/output devices), as well as process data using the processors 804 to generate output. The operating system 810 may include a presentation component that presents the output (e.g., display the data on an electronic display, store the data in memory, transmit the data to another electronic device, etc.). The operating system 810 may include a hypervisor that allows the computing device to operate one or more virtual machines and/or virtual network components. Additionally, the operating system 810 may include other components that perform various additional functions generally associated with an operating system.

The load balancer 812 is a program responsible for distributing workload (e.g., packets) to multiple computing resources (e.g., servers) or other endpoints in the network. The load balancer 812 may operate an algorithm that uses static information or dynamic status of various network components to determine where to dispatch the workload. In some embodiments, the load balancer 812 is constrained to distribute tasks to certain servers that has valid NAT binding.

The application client marker extractor 814 is a software component that extracts application client marker from packets from application server instances. In some embodiments, the application client marker extractor 814 includes a UDP decapsulator that extracts source IP:port tuple of a client device from an UDP encapsulated interior header. In some embodiments, the application client marker extractor 814 implements a DTLS CID manager that decodes DTLS connection identifier of the packets into IP:port tuple of a client device. The decoded client IP:port tuple may then be used for generating a new NAT binding or for re-binding client-side IP:port tuple of a client device with server-side IP:port tuple of a server after expiration of earlier NAT bindings.

The API 816 is a collection of software component that enables the middlebox computing device 800 to receive and transmit messages to other devices. The API 816 may include components that allow the middlebox computing device 800 to receive out-of-band messages from an application server. Such out-of-band messages may be used to generate NAT bindings.

The network address translator 818 is a program that performs network address translation based on NAT bindings. Specifically, the network translator 818 translates the source IP address from client-side IP:port tuples of the client into server-side IP:port tuples of the middlebox (and vice versa), and translate the destination IP address from the client-side IP:port tuple of the middlebox to server-side IP:port tuple of the corresponding server (and vice versa). The network address translator may use the association between client-side IP addresses and server-side IP addresses in the bindings to perform the address translation. The network address translator 818 may also use the application client markers in the bindings to perform address translation.

The NAT binding manager 820 is a program that controls the creation and expiration of NAT bindings. The NAT binding manager 820 monitors the NAT bindings that are stored in the NAT binding storage 822 to check for activities. If a NAT binding has not been used for a threshold period of time, the NAT binding manager 820 may remove the binding from the NAT binding storage 822 (which is an area of the memory 808 that stores currently valid NAT bindings that can be used for NAT operations.) The NAT binding manager may also create new bindings based on out-of-band messages received from the API 816. The NAT binding manager 820 may also re-create bindings based on IP:port tuple or application client markers received from an application server.

The security enforcer 824 is a program that determines whether a packet can be forwarded or should rejected based security policies. In some embodiments, the security enforcer 824 accepts only traffic from a pre-configured pool of originating or source IP addresses or outgoing packets received on the pre-configured NAT IP address destination pool. In some embodiments, the security enforcer 824 drops any packet that does not have the correct encapsulated payload (e.g., does not have the correct application client marker in a UDP encapsulated interior header.)

Figure 9:
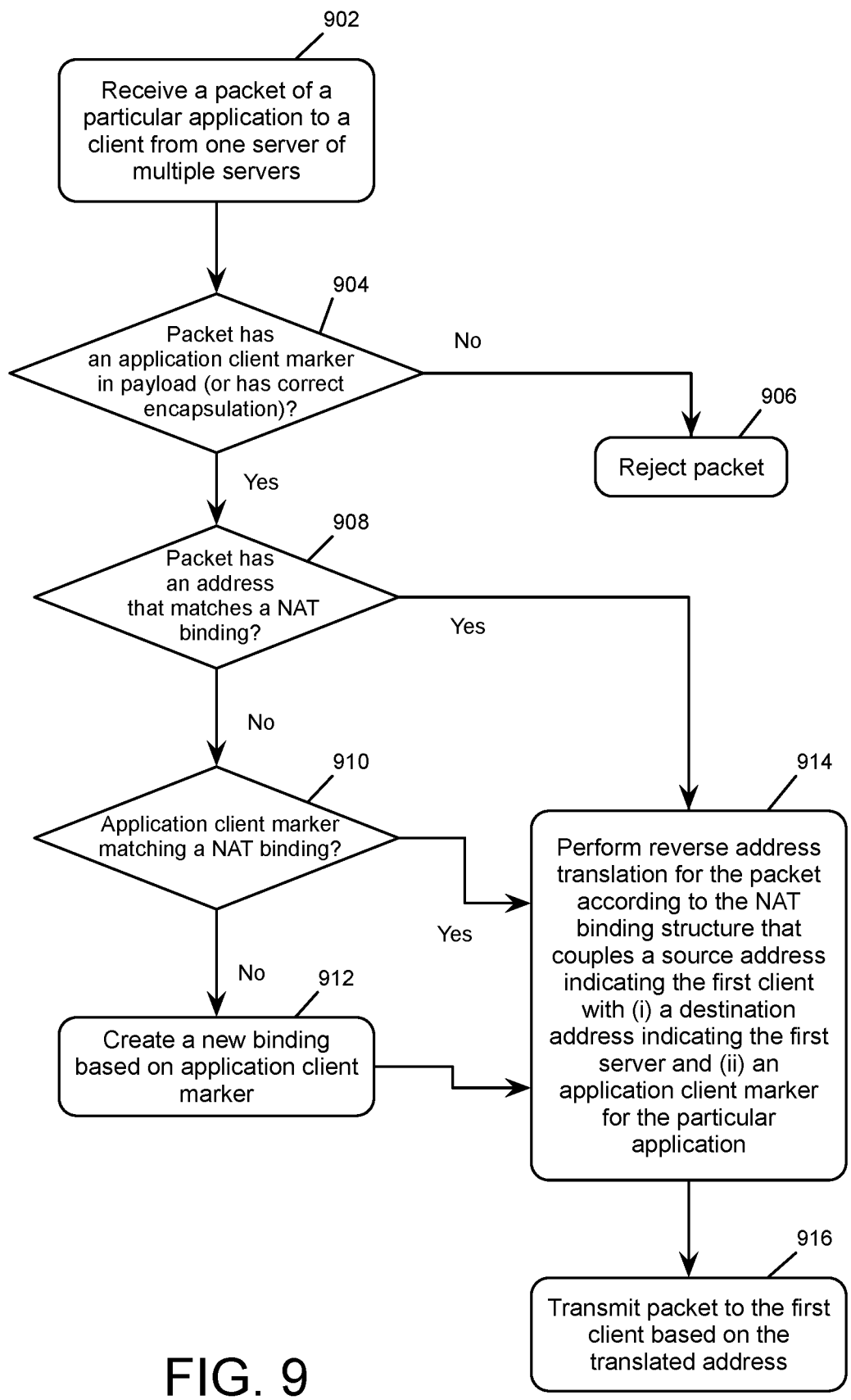
FIG. 9 conceptually illustrates a flow diagram of an example process 900 performed by a middlebox in a network with a large IoT deployment.

FIG. 9 conceptually illustrates a flow diagram of an example process 900 performed by a middlebox in a network with a large IoT deployment. The middlebox is a proxy that performs forward and reverse network address translation (NAT), line balancing (LB) and other middlebox functions. The middlebox performs the process 900 when relaying packets from servers to client devices. The middlebox may re-create NAT bindings that have expired due to IoT devices sleeping and awakening.

The process 900 is illustrated as a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like, that perform particular functions or implement particular abstract data types. The order in which the operations are described is not intended to be construed as a limitation, and any number of the described blocks can be combined in any order and/or in parallel to implement the process.

At block 902, the middlebox receives a packet from a server to a client of a particular application. A packet received from a server of the particular application may include an application client marker of the client for the particular application. In some embodiments, the application client marker may include an address of the client (e.g., a source IP:port tuple.) In some embodiments, packets received by the middlebox from the servers may include User Datagram Protocol (UDP) encapsulation. A UDP header of such a UDP encapsulation may include destination address indicating the server, and an interior header of the UDP encapsulation may include the application client marker. In some embodiments, packets received by the middlebox from the servers may include a Datagram Transport Layer Security (DTLS) connection identifier that encodes an IP:port combination for the client to serve as the application client marker of the client for the particular application.

At block 904, the middlebox determines whether the packet has an application client maker in the payload. In some embodiments, the middlebox determines whether to forward or reject a packet based on whether the packet has the correct encapsulated payload (e.g., does not have the correct application client marker in a UDP encapsulated interior header.) If the packet has an application client marker in the payload (or has correct encapsulated payload), the process proceeds to block 908. If the packet does not have an application client marker in the payload (or does not have correct encapsulated payload), the middlebox rejects (at block 906) the packet.

At block 908, the middlebox determines whether the packet has an address that matches a NAT binding. If so, the process proceeds to block 914. If the packet does not have an address that matches a NAT binding, the process proceeds to 910.

At block 910, the middlebox determines whether the application client marker of the packet matches a NAT binding. If so, the process proceeds to block 914. If the application client marker of the packet does not match any NAT binding, the middlebox creates (at block 912) a new binding based on the application client marker before proceeding to block 914.

At block 914, the middlebox performs reverse address translation for the packet according to the NAT binding. The NAT binding is a data structure that couples a source address indicating the client with (i) a destination addresses indicating the server and (ii) an application client marker of the first client for the particular application. At block 916, the middlebox transmits packet to the first client based on the translated address.

For example, for a packet from a first server to the client of the particular application, the middlebox performs reverse address translation by using the destination address indicating the first server in the binding structure to determine the source address indicating the client. For a packet from a second server to the client of the particular application that does not have a matching NAT binding structure, the middlebox performs reverse address translation by using the application client marker in the binding structure to determine the source address indicating the client. The application client marker from the second packet of the second server may also be used to generate a binding structure that couple the source address indicating the client with (i) a destination addresses indicating the second server and (ii) the application client marker. The middlebox may also generate the NAT binding when an application server uses an API to send the application client marker to the middlebox.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A computing device comprising:
one or more processors; and
a computer-readable storage medium storing a plurality of computer-executable components that are executable by the one or more processors to perform a plurality of actions, the plurality of actions comprising:
  receiving, by a computing device and from a first server, a first packet that includes a first application client marker (i) for an application and (ii) that includes a client-side address of a client device and a client-side address of the computing device;
  generating, by the computing device, a network address translation (NAT) binding using the first application client marker and a server-side address of the computing device and a server-side address of the first server;
  receiving, by the computing device and from the client device, a second packet;
  in response to receiving the first packet that includes the first application client marker for the application, determining, by the computing device, that the client device corresponds to the NAT binding;
  generating, by the computing device, an updated second packet by combining the second packet and the first application client marker in the NAT binding;
  transmitting, by the computing device and to the first server, the updated second packet that includes the second packet and the first application client marker;
  receiving, by the computing device and from the client device, a third packet;
  receiving, by the computing device and from a second server, fourth packet that includes a second application client marker (i) for the application and (ii) that includes the client-side address of the client device and the client-side address of the computing device;
  in response to receiving the fourth packet that includes the second application client marker for the application, determining, by the computing device, that the client device no longer corresponds to the NAT binding;
  in response to receiving the fourth packet that includes the second application client marker for the application updating, by the computing device, the NAT binding using the second application client marker;
  generating, by the computing device, an updated third packet by combining the third packet and the second application client marker in the updated NAT binding; and
  transmitting, by the computing device and to the second server, the updated third packet that includes the third packet and the second application client marker.

2. The computing device of claim 1, wherein:
the first and fourth packets are User Datagram Protocol (UDP) packets;
a UDP header of the first packet includes the server-side address of the first server and a payload of the first packet includes the first application client marker; and
a UDP header of the fourth packet includes the server-side address of the second server and a payload of the fourth packet includes the second application client marker.

3. The computing device of claim 1, wherein the first and second application client markers comprise a Datagram Transport Layer Security (DTLS) connection identifier that encodes an IP address and a port combination for the client device.

4. The computing device of claim 1, wherein the first and second servers use an application program interface (API) to send the first and second application client markers to the computing device.

5. The computing device of claim 1, wherein:
the first and fourth packets are forwarded to the client device when the first packet includes the first or second application client markers, and
a fifth packet is rejected and not forwarded to the client device when the fifth packet does not include an application client marker.

6. The computing device of claim 1, wherein the actions comprise performing forward address translation for a fifth packet of the application from the client device to the second server according to the NAT binding.

7. The computing device of claim 1, wherein the actions comprise performing load balancing among a plurality of servers comprising the first and second servers.

8. A computer-implemented method, comprising:
receiving, by a computing device and from a first server, a first packet that includes a first application client marker (i) for an application and (ii) that includes a client-side address of a client device and a client-side address of the computing device;
generating, by the computing device, a network address translation (NAT) binding using the first application client marker and a server-side address of the computing device and a server-side address of the first server;
receiving, by the computing device and from the client device, a second packet;
in response to receiving the first packet that includes the first application client marker for the application, determining, by the computing device, that the client device corresponds to the NAT binding;
generating, by the computing device, an updated second packet by combining the second packet and the first application client marker in the NAT binding;
transmitting, by the computing device and to the first server, the updated second packet that includes the second packet and the first application client marker;

receiving, by the computing device and from the client device, a third packet;

receiving, by the computing device and from a second server, a fourth packet that includes a second application client marker (i) for the application and (ii) that includes the client-side address of the client device and the client-side address of the computing device;

in response to receiving the fourth packet that includes the second application client marker for the application, determining, by the computing device, that the client device no longer corresponds to the NAT binding;

in response to receiving the fourth packet that includes the second application client marker for the application updating, by the computing device, the NAT binding using the second application client marker;

generating, by the computing device, an updated third packet by combining the third packet and the second application client marker in the updated NAT binding; and transmitting, by the computing device and to the second server, the updated third packet that includes the third packet and the second application client marker.

9. The computer-implemented method of claim 8, wherein:

the first and fourth packets are User Datagram Protocol (UDP) packets;

a UDP header of the first packet includes the server-side address of the first server and a payload of the first packet includes the first application client marker; and a UDP header of the fourth packet includes the server-side address of the second server and a payload of the fourth packet includes the second application client marker.

10. The computer-implemented method of claim 8, wherein the first and second application client markers comprise a Datagram Transport Layer Security (DTLS) connection identifier that encodes an IP address and a port combination for the client device.

11. The computer-implemented method of claim 8, wherein the first and second servers use an application program interface (API) to send the first and second application client markers to the computing device.

12. The computer-implemented method of claim 8, wherein:

the first and fourth packets are forwarded to the client device when the first packet includes the first or second application client markers, and a fifth packet is rejected and not forwarded to the client device when the fifth packet does not include an application client marker.

13. The computer-implemented method of claim 8, comprising performing forward address translation for a fifth packet of the application from the client device to the second server according to the NAT binding.

14. The computer-implemented method of claim 8, comprising performing load balancing among a plurality of servers comprising the first and second servers.

15. One or more computer-readable storage media of a computing device storing computer-executable instructions that upon execution cause one or more processors to perform acts comprising:

receiving, by a computing device and from a first server, a first packet that includes a first application client marker (i) for an application and (ii) that includes a client-side address of a client device and a client-side address of the computing device;

generating, by the computing device, a network address translation (NAT) binding using the first application client marker and a server-side address of the computing device and a server-side address of the first server;

receiving, by the computing device and from the client device, a second packet;

in response to receiving the first packet that includes the first application client marker for the application, determining, by the computing device, that the client device corresponds to the NAT binding;

generating, by the computing device, an updated second packet by combining the second packet and the first application client marker in the NAT binding;

transmitting, by the computing device and to the first server, the updated second packet that includes the second packet and the first application client marker;

receiving, by the computing device and from the client device, a third packet;

receiving, by the computing device and from a second server, a fourth packet that includes a second application client marker (i) for the application and (ii) that includes the client-side address of the client device and the client-side address of the computing device;

in response to receiving the fourth packet that includes the second application client marker for the application, determining, by the computing device, that the client device no longer corresponds to the NAT binding;

in response to receiving the fourth packet that includes the second application client marker for the application updating, by the computing device, the NAT binding using the second application client marker;

generating, by the computing device, an updated third packet by combining the third packet and the second application client marker in the updated NAT binding; and transmitting, by the computing device and to the second server, the updated third packet that includes the third packet and the second application client marker.

16. The one or more computer-readable storage media of claim 15, wherein:

the first and fourth packets are User Datagram Protocol (UDP) packets;

a UDP header of the first packet includes the server-side address of the first server and a payload of the first packet includes the first application client marker; and a UDP header of the fourth packet includes the server-side address of the second server and a payload of the fourth packet includes the second application client marker.

17. The one or more computer-readable storage media of claim 15, wherein the first and second application client markers comprise a Datagram Transport Layer Security (DTLS) connection identifier that encodes an IP address and a port combination for the client device.

18. The one or more computer-readable storage media of claim 15, wherein the first and second servers use an application program interface (API) to send the first and second application client markers to the computing device.

19. The one or more computer-readable storage media of claim 15, wherein:

the first and fourth packets are forwarded to the client device when the first packet includes the first or second application client markers, and a fifth packet is rejected and not forwarded to the client device when the fifth packet does not include an application client marker.

20. The one or more computer-readable storage media of claim 15, wherein the acts comprise performing forward address translation for a fifth packet of the application from the client device to the second server according to the NAT binding.

21. The one or more computer-readable storage media of claim 15, wherein the acts comprise performing load balancing among a plurality of servers comprising the first and second servers.

* * * * *